United States Patent [19]

Kurosawa et al.

[11] Patent Number: 4,837,492

[45] Date of Patent: Jun. 6, 1989

[54] APPARATUS FOR DETECTING REVOLUTION USING A SYNCHRO

[75] Inventors: Ryoichi Kurosawa, Kokubunji; Kouzou Kawata, Hino, both of Japan

[73] Assignee: Kabushiki Kaisha Toshiba, Kawasaki, Japan

[21] Appl. No.: 169,977

[22] Filed: Mar. 18, 1988

[30] Foreign Application Priority Data

Mar. 18, 1987 [JP] Japan .................................. 62-61217
Mar. 18, 1987 [JP] Japan .................................. 62-61218

[51] Int. Cl.$^4$ .............................................. G05B 1/06
[52] U.S. Cl. ..................................... 318/661; 324/166
[58] Field of Search ............... 318/661, 654, 655, 659, 683, 318/660; 324/166

[56] References Cited

U.S. PATENT DOCUMENTS

| 4,023,085 | 5/1977 | Bishop et al. | 318/608 |
| 4,346,334 | 8/1982 | Inoue | 318/654 |
| 4,358,722 | 11/1982 | Iwakane et al. | 318/654 X |
| 4,518,905 | 5/1985 | Rhodes | 318/661 |
| 4,527,120 | 7/1985 | Kurosawa | 324/166 |
| 4,611,269 | 9/1986 | Suzuki et al. | 318/661 X |
| 4,677,138 | 5/1987 | Harper | 318/654 X |

FOREIGN PATENT DOCUMENTS 1150615 1/1958 France .

OTHER PUBLICATIONS

Patent Abstracts of Japan, vol. 10, No. 330 (p. 514) (2386), 11th Nov. 1986, p. 112, p. 514—JP-A-61 137 010.
Patent Abstracts of Japan, vol. 9, No. 6 (p. 326) (1729), 11th Jan. 1985, p. 15, p. 326—JP-A-59 154 317.
Patent Abstracts of Japan, vol. 10, No. 173 (p. 469) (2229), 18th Jan. 1986—JP-A-61 23 916.

Primary Examiner—Benjamin Dobeck
Attorney, Agent, or Firm—Foley & Lardner, Schwartz, Jeffery, Schwaab, Mack, Blumenthal & Evans

[57] ABSTRACT

To the primary winding of a synchronous electric machine, a polyphase a.c. excitation signal from an excitation circuit is applied. Thus, an induced voltage signal, the phase of which varies by an angle proportional to a rotational position of a rotary body, is produced on the secondary winding of the synchro. A phase difference produced between the a.c. excitation signal and the induced voltage signal is detected by a phase difference detecting circuit. This phase difference detecting circuit detects not only a phase difference itself, but also detects the time at which the phase difference has been detected. On the basis of the phase difference and the time thus detected, a predictive computation circuit predicts a rotational position of the rotary body at an arbitrary time. In addition, a rate multiplier circuit for setting a value corresponding to a change in a predicted rotational position and an up/down counter circuit for counting the output thereof are further added, thereby making it possible to provide the output of the up/down counter circuit as a rotational position.

8 Claims, 5 Drawing Sheets

APPARATUS FOR DETECTING REVOLUTION USING A SYNCHRO

BACKGROUND OF THE INVENTION

This invention relates to an apparatus for detecting a rotational position or a rotational speed of a rotary body such as a rotor of an electric motor.

Synchros called resolvers or selsyns, etc. are widely used for the detection of revolution of electric motors because they are similar in structure to electric motors and have high reliability. For constituting an apparatus for detecting revolution using a synchro, it is required to combine the synchro with a converter, e.g., a synchro/digital converter (S/D converter), or a resolver/digital converter (R/D converter), etc.

Two kinds of representative converter systems are known. One system is a system called the tracking type converter, for example, IS14, IS24, IS44 and IS64, etc. by ANALOG DEVICES Inc. When the primary winding of a synchro is subjected to single-phase excitation, an induced voltage signal having an amplitude determined by the sine-wave and cosine-wave functions corresponding to a rotational position is produced on the two-phase secondary winding. In the converter, a type of phase locked loop is constituted so that sine-wave and cosine-wave signals prepared by the count value of an up/down counter follow the amplitude of an induced voltage signal varying in a sinusoidal manner by changes in the rotational position. By conducting an operation such that the count value of the up/down counter follows the rotational position to read the count value therefrom, the rotational position can be obtained as a value converted to a corresponding digital value. This system is able to read rotational digital value. This sytem is able to read rotational position at all times. However, not is this system complicated in its construction and expensive, but also it includes many analog elements, thus making it difficult to realize an implementation as an integrated circuit.

The other system is a system called the phase detection type converter. When the two-phase primary winding of a synchro is excited by a two-phase sine-wave signal, a sinusoidal induced voltage signal which changes phase in accordance with the rotational position is produced on the secondary winding thereof. By detecting a phase change in the induced voltage signal with respect to the excitation sine-wave signal, the rotational position is detected.

This phase detection type converter is simple in circuit configuration and most parts thereof are configured as a digital circuit, thus being capable of being realized at a low cost. With this sytem, however, the value detected is only updated every zero point of a secondary induced voltage of the synchro, so that when the rotational position changes, the detection period fluctuates in dependence upon the rotational speed. Accordingly, since it is impossible to establish synchronization with the sampling period for digital control, it is also difficult to apply this system to the digital control of electric motors. In addition, in the case of obtaining a higher resolution of detecting rotational position of multi-revolution using a combination of synchros having different poles called multiple-speed synchros, or of a plurality of synchros decelerated by reduction gears, since respective detection timings are different from each other, it is difficult to synthesize a plurality of detected values when the rotational speed becomes high.

SUMMARY OF THE INVENTION

This invention has been made in view of the above and an object is to provide an apparatus for detecting revolution using a synchro which has solved fluctuation of the detection period, which is a drawback with the phase detection type converter, while effectively utilizing the merits of the circuit configuration of that type of converter, thus to be suited for digital control.

To achieve this object, an apparatus for detecting revolution using a synchro according to this invention is characterized by: the provision of an excitation circuit for generating a polyphase a.c. excitation signal, a synchro coupled to a rotary body, in which a polyphase primary winding is excited by the a.c. excitation signal to produce on a secondary winding an induced voltage signal the phase of which varies by an angle proportional to a rotational position of the rotary body, a phase difference detecting circuit for detecting a phase difference between the a.c. excitation signal and the induced voltage signal and the detection time thereof, and a predictive computation circuit for predicting a rotational position of the rotary body at fixed periods from phase differences of two times or more and from the detection times thereof, which have been detected by the phase difference detecting circuit. Moreover, a rate multiplier circuit in which a value corresponding to a change in a rotational position predicted by the predictive computation circuit is set, and an up and down counter for counting an output of the rate multiplier circuit are further added, thereby allowing a time for predicting a rotational position in the predictive computation circuit to be set to a time determined by taking into consideration a time required for an output of the up and down counter circuit to follow so that the output of the up and down counter circuit is substantially in correspondence with the rotational position.

DESCRIPTION OF THE PREFERRED EMBODIMENT

Prior Art Apparatus

Figure 1:
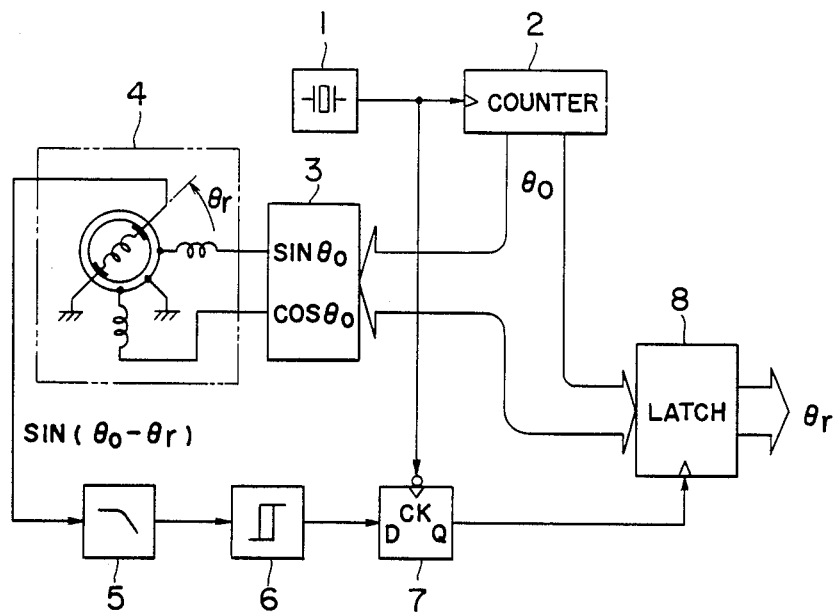
FIG. 1 is a block diagram showing a basic configuration of a conventional apparatus for detecting revolution using the phase detection type converter system.

Prior to the description of embodiments according to this invention, the basic configuration of a typical conventional apparatus for detecting revolution will be explained for reference. As shown in FIG. 1, this conventional apparatus includes a clock generating circuit 1, a counter circuit 2, a function circuit 3, a synchro (resolver) 4, a filter circuit 5, a comparator circuit 6, a flip-flop circuit 7, and a latch circuit 8.

Clock pulses output from the clock generating circuit 1 are counted by the counter circit 2. The count value $\theta_o$ increases with time. This count value $\theta_o$ is input to the function circuit 3. Thus, two-phase sine-wave signals sin $\theta_o$ and cos $\theta_o$ corresponding to the count value $\theta_o$ are output. This function circuit 3 may be constituted by a read only memory (ROM) ino which e.g., sine-wave and cosine-wave functions are written, and a digital-/analog converter. The synchro 4 is excited by the sine-wave signal output from the function circuit 3. Thus, an induced voltage signal sin $(\theta_o - \theta_r)$, the phase of which varies with respect to the excitation sine-wave signal depending upon the rotational position $\theta_r$, is output from the secondary winding. The output from the synchro 4 passes through the filter circuit 5, whereby noises or distortion components are eliminated and are then input to the comparator circuit 6. Responding to this, a rectangular wave varying at zero points of the sine-wave of the induced voltage signal is output from the comparator circuit 6. At the time of the rise thereof, the relationship expressed by the following equation (1) holds:

$$\theta_o - \theta_r = 2n\pi \text{(n is an integer)} \quad (1).$$

Accordingly, when the count value $\theta_o$ of the counter circuit 2 is latched at the rise of the comparator circuit 6, the relationship expressed by the following equation (2) holds:

$$\theta_o = 2n\pi + \theta_r \quad (2).$$

When a value about $2\pi$ of the count value $\theta_o$ of the counter circuit 2 is neglected as an overflow, the relationship expressed by the following equation (3) eventually holds:

$$\theta_o = \theta_r \quad (3).$$

For latching at a good timing the count value $\theta_o$ of the counter circuit 2 which continues counting at all times, a fall triggerable D-type flip-flop circuit 7 is used. The output of the comparator circuit 6 is connected to the data input D of the flip-flop circuit 7 and the output of the clock generating circuit 1 is connected to the clock input CK of the flip-flop circuit 7. This circuit configuration permits the data input D to be subjected to sampling at the time of the fall of the clock pulse. Thus, a rectangular wave the change time of which is synchronized with the time of the fall of the clock pulse, is output from the flip-flop circuit 7. When the output of the flip-flop circuit 7 is assumed as the clock input of the latch circuit 8, since the count value $\theta_o$ of the counter circuit 2 changes at the time of the rise of the clock pulse, the count value $\theta_o$ can be correctly latched.

Thus, the rotational position $\theta_r$ can be detected as a digital value by the value latched by the latch circuit 8. It is to be noted that this value detected is a value updated at zero points of the secondary induced voltage of the synchro and that such an update period fluctuates or changes depending upon revolving speed. For this reason, as previously described, there occurs the problem that synchronization iwth the sampling period is not established in the digital control unit, resulting in poor applicabiliy to the digital control unit. Such a problem can be solved with an apparatus according to this invention which will be described below.

FIRST EMBODIMENT

This invention is based on a scheme to detect phase differences between an excitation signal of the synchro and an output induced voltage signal and to detect times at which the phase differences have been detected, thus allowing performance of a predictive computation of the rotational position at an arbitrary time by using these plural data detected.

Figure 2:
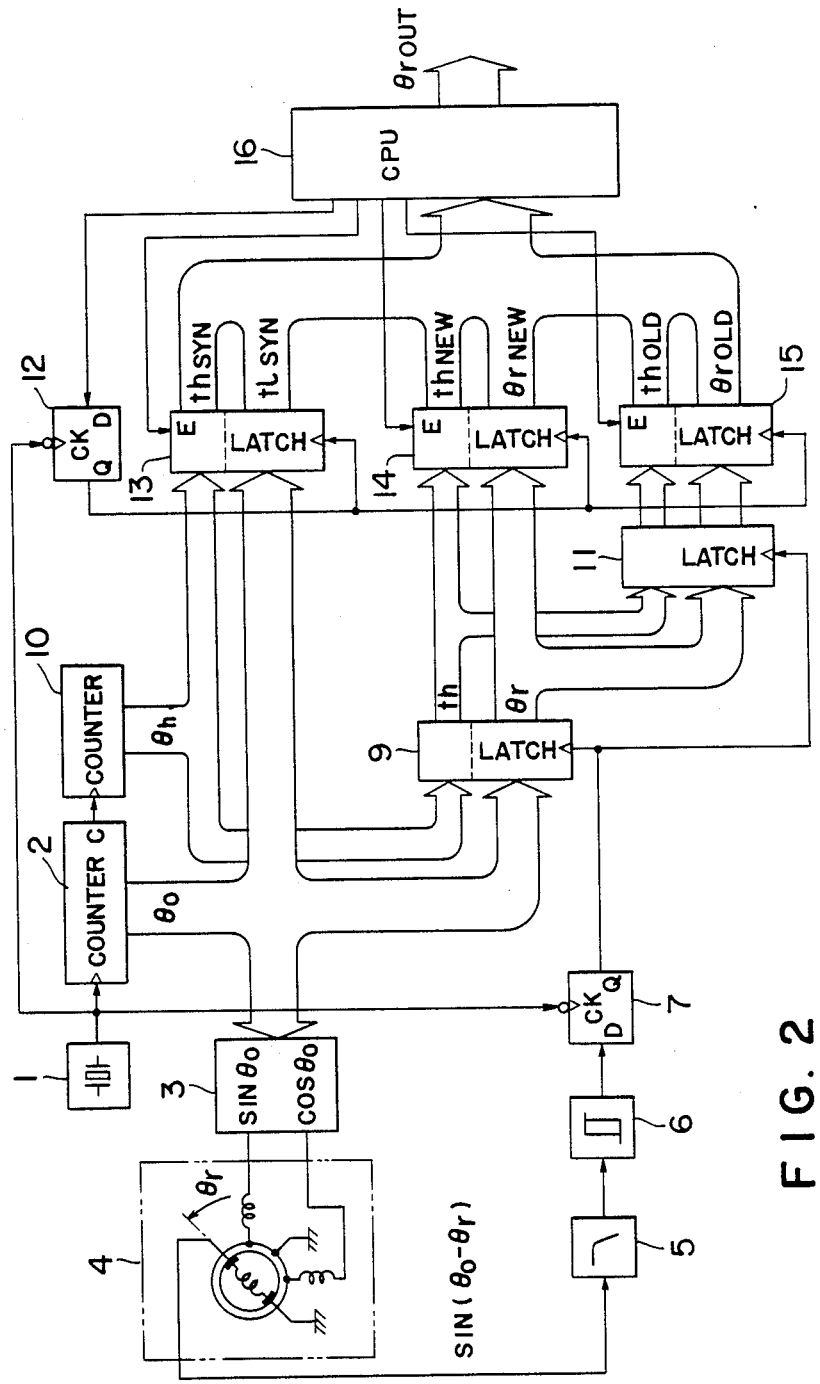
FIG. 2 is a block diagram showing a basic configuration of an apparatus for detecting revolution according to a first embodiment of this invention.

A circuit of a first embodiment of this invention will be described with reference to FIG. 2. This circuit includes the same circuit arrangement as in the conventional apparatus, which is comprised an excitation circuit comprising clock generating circuit 1, counter circuit 2, and function circuit 3 to generate an a.c. excitation signal, synchro (resolver) 4 having polyphase primary and secondary windings coupled to a rotary body, filter circuit 5, comparator circuit 6, and flip-flop circuit 7. This circuit further includes, as new components, a phase difference detecting circuit comprising a latch circuit 9 and a counter circuit 10 to detect a phase difference and a detection time thereof, and a predictive computation circuit comprising latch circuits 11, 13, 14 and 15, a flip-flop circuit 12 and a microcomputer 16. Latch circuits 13, 14 and 15 are tristate output type latches capable of controlling an output.

The basic operating principle of this circuit will be explained first. When the polyphase primary winding of the synchro 4 is excited by the a.c. excitation signal output from the excitation circuit, an induced voltage signal, the phase of which varies in dependence upon the rotational position, is produced on the secondary winding. By detecting a zero point of the induced voltage signal using the filter circuit 5, the comparator circuit 6 and the flip-flop circuit 7, and by latching the count value of the counter circuit 2 indicating the phase of the a.c. excitation signal at that time using the latch circuit 9, a phase change is detected by the phase difference detecting circuit as a phase difference between the a.c. excitation signal and the induced voltage signal. At this time, also by latching the count value of the counter circuit 10 of higher order then the counter circuit 2, not only the phase difference but also the detection time thereof are detected in the latch circuit 9. Simultaneously with this, the previous phase difference and the detection time thereof are transferred to the latch circuit 11 of the predictive computation circuit. In the predictive computation circuit, a predictive rotational position at an arbitrary time is computed using these data.

The operation of this predictive computation circuit will now be described in detail. The clock pulses output from the clock generating circuit 1 are counted by the counter circuit 2. The count value $\theta_o$ increases with time. This count value $\theta_o$ is input to the function circuit 3. Thus, two-phase sine-wave signals sin $\theta_o$ and cos $\theta_o$ corresponding to the count value $\theta_o$ are output. The synchro (resolver) 4 is excited by the two-phase sine-wave signals output from the function circuit 3. As a result, an induced voltage signal sin $(\theta_o - \theta_r)$, the phase of which varies with respect to the excitation sine-wave signal depending upon the rotational position $\theta_r$, is output from the secondary winding. The output from the synchro 4 passes through the filter circuit 5 in the same manner as stated above, whereby noise and distortion components are eliminated therefrom. Thus, such an output is changed to a rectangular wave varying at the zero point of the induced voltage signal through the comparator circuit 6 and the flip-flop circuit 7. At the time of the rise of the rectangular wave, the count value $\theta_o$ of the counter circuit 2 is latched by the latch circuit 9 to thereby detect a rotational position $\theta_r$ as a phase difference between the excitation signal and the induced voltage signal. At this time, a count value $\theta_h$ of the high order counter 10 of the counter circuit 2 is also latched as data $t_h$ by the same latch circuit 9. The data t ($t = t_h \cdot \theta_r$: The center dot is used as a divider between an upper order data and a lower order data in the specification) obtained as the combination of the upper order data $t_h$ and the lower order data $\theta_r$ which have been latched by the latch circuit 9 represents the time at which the rotational position $\theta_r$ has been detected. Simultaneously with this, the data indicative of the previous rotational position and the data indicative of the detection time thereof which were latched by the latch circuit 9 are transferred. Accordingly, at all times data $\theta_{r\ NEW}$ indicative of the latest rotational position and the data $t_{NEW}$ ($= t_{h\ NEW} \cdot \theta_{r\ NEW}$) indicative of the detection time thereof are latched in the latch circuit 9 and data $\theta_{r\ OLD}$ indicative of the rotational position one time before and the data $t_{OLD}$ ($= t_{h\ OLD} \cdot \theta_{r\ OLD}$) indicative of the detection time thereof are latched in the latch circuit 11. The microcomputer 16 changes the data input D of the flip-flop circuit 12 from logic "0" to "1" at an arbitrary time as a command for reading these data thereinto. The output of the clock generating circuit 1 is connected to the clock input CK of the flip-flop circuit 12. Thus, by the same function as the flip-flop 7, the data input D of the flip-flop circuit 12 is synchronized with the fall of the clock pulse, thus to be output from the flip-flop circuit 12. In response to the rise of the output of this flip-flop circuit 12, the data $\theta_{r\ NEW}$ indicative of the latest rotational position and the data $t_{NEW}$ ($= t_{h\ NEW} \cdot \theta_{r\ NEW}$) indicative of the detection time thereof are transferred from the latch circuit 9 to the latch circuit 14, and the data $\theta_{r\ OLD}$ indicative of the rotational position one time before and the data $t_{OLD}$ ($= t_{h\ OLD} \cdot \theta_{r\ OLD}$) indicative of the detection time thereof are transferred from the latch circuit 11 to the latch circuit 15. The count values $\theta_h$ and $\theta_o$ of the counter circuit 10 and the counter circuit 2 at this time are latched simultaneously by the latch circuit 13 as the time data $t_{SYN}$ ($= t_{h\ SYN} \cdot t_{l\ SYN}$). These latch circuits are provided for preventing the microcomputer 16 from reading thereinto data at the same time. The microcomputer 16 reads these data to perform a predictive computation.

Figure 3:
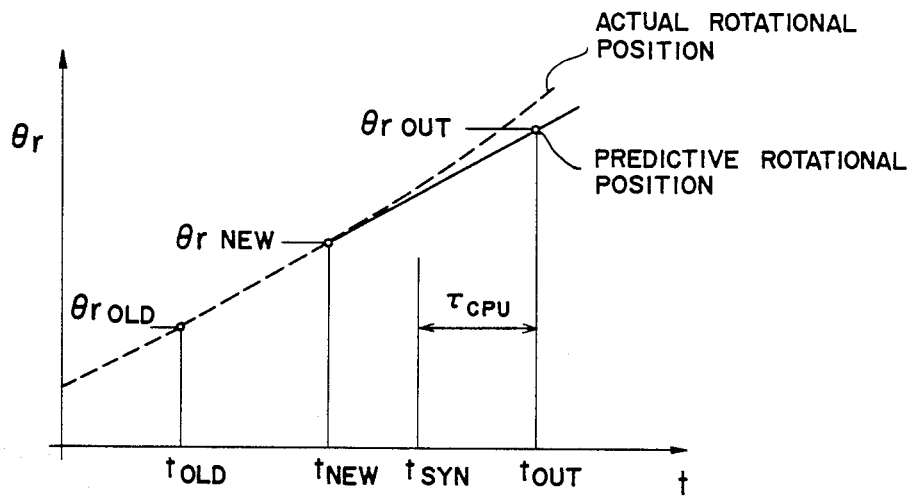
FIG. 3 is a graphical representation showing the principle of the predictive computation in the apparatus shown in FIG. 2.

The principle of the computation for predicting a rotational position is shown in FIG. 3 wherein the abscissa and the ordinate represent a time t and a rotational position $\theta_r$, respectively. In this figure, the latest rotational position data latched by the latch circuit 14 is designated as $\theta_{r\ NEW}$, the data indicative of the detection time thereof as $t_{NEW}$, the data indicative of the rotational position one time before latched by the latch circuit 15 as $\theta_{r\ OLD}$, the data indicative of the detection time thereof as $t_{OLD}$, and data indicative of the time when the microcomputer 16 has sent a command for reading data, which have been latched by the latch circuit 13, at $t_{SYN}$.

For carrying out the predictive computation of a predictive rotational position $\theta_{r\ OUT}$ at time $t_{OUT}$, it is sufficient to obtain the predictive rotational position $\theta_{r\ OUT}$ by linear approximation from the rotational position $\theta_{r\ OLD}$ one time before and the detection time $t_{OLD}$ thereof, and the latest rotational position $\theta_{r\ NEW}$ and the detection time $t_{NEW}$ thereof. Such a predictive computation is expressed by the following equation (4):

$$\theta_{r\ OUT} = (\theta_{r\ NEW} - \theta_{r\ OLD}) \times (t_{OUT} - t_{NEW})/(t_{NEW} - t_{OLD}) + \theta_{r\ NEW} \quad (4)$$

Taking into consideration a time $\tau_{CPU}$ required for the predictive computation by the microcomputer 16, the time $t_{OUT}$ is defined as indicated by the following equation (5):

$$t_{OUT} = t_{SYN} + \tau_{CPU} \quad (5)$$

The microcomputer 16 executes the predictive computation shown in the equations (4) and (5), thus to output a predictive rotational position $\theta_{r\ OUT}$ at the time $t_{OUT}$.

In accordance with the first embodiment having been described, it is possible to predict a rotational position at an arbitrary time, thus to output it at that time. Accordingly, the prior art inconvenience of the detection period being determined by the excitation frequency or the revolving speed is avoided.

SECOND EMBODIMENT

Figure 4:
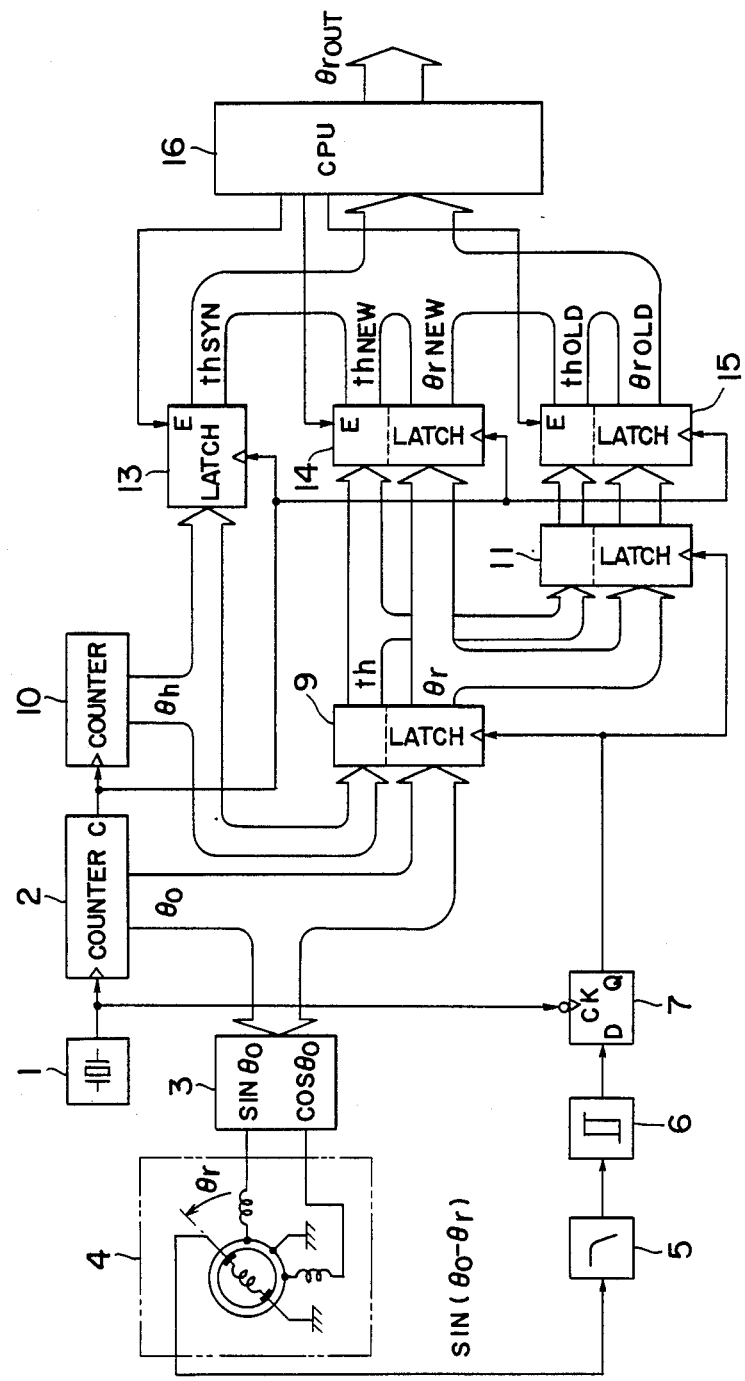
FIG. 4 is a block diagram showing a basic configuration of an apparatus for detecting revolution according to a second embodiment of this invention.

A second embodiment of this invention is shown in FIG. 4. Since a digital control unit has a fixed sampling period in general, it is desirable that the detection period be fixed when applied to the apparatus for detecting revolution. In this embodiment, the detection period is set to a fixed value equal to the excitation period. This embodiment differs from the first embodiment in that the flip-flop circuit 12 is not provided, that the latch circuit 13 latches only the count value $\theta_h$ of the counter circuit 10, and that the latch circuits 13 and 14 carry out the latch operation using the carry out C of the counter circuit 2.

While the latch circuits 13, 14 and 15 carry out the latch operation at an arbitrary time by a command from the microcomputer 16 in the first embodiment, the carry output C of the counter circuit 2 the period of which is the same as the excitation period, is used as a latch command in this embodiment. The microcomputer 16 examines changes in the data of the latch circuit 13 and sequentially reads thereinto data of the latch circits 13, 14 and 15 when any change occurs. The latch circuit 13 latches only the count value $\theta_h$ of the counter circuit 10. Since the count value of the counter circuit 2 is equal to zero at the time of the latch operation, the time $t_{SYN}$ ($= t_{h\ SYN} \cdot 0$) is used for the latch command. The microcomputer 16 executes the predictive computation expressed as the equations (4) and (5) in the same manner as in the first embodiment, thus outputting a predictive rotational position $\theta_{r\ OUT}$ at time $t_{OUT}$.

The period at which the microcomputer 16 outputs the predictive rotational position $\theta_{r\ OUT}$ becomes a fixed period equal to the excitation period.

THIRD EMBODIMENT

Figure 5:
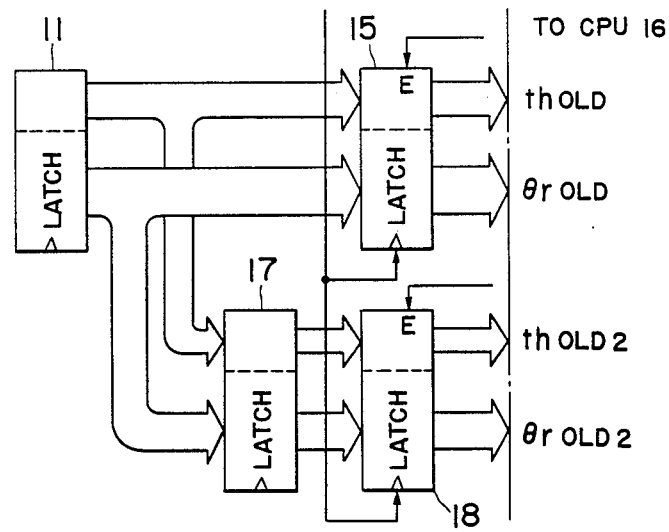
FIG. 5 is a block diagram showing a basic configuration of a portion of an apparatus for detecting revolution according to a third embodiment of this invention.

In the above-mentioned two embodiments, the predictive computation is carried out by using two phase differences and their detection times. If a large number of phase differences and their detection times are used, more precise predictive computation can be expected. FIG. 5 shows a circuit additionally provided for conducting a predictive computation using three phase differences and their detection times. In this circuit configuration, a latch circuit 17 is additionally connected to the output of the latch circuit 11 and a latch circuit 18 is further additionally connected to the output of the latch circuit 17.

The data $\theta_{r\ OLD2}$ indicative of the rotational position two times before and the data $t_{OLD2}$ ($=t_{h\ OLD2} \cdot \theta_{r\ OLD2}$) indicative of the detection time thereof are latched in the latch circuit 17. The microcomputer 16 reads thereinto the data $\theta_{r\ OLD2}$ indicative of the rotational position two times before and the data $t_{OLD2}$ ($=t_{h\ OLD2} \cdot \theta_{r\ OLD2}$) along with other data through the latch circuit 18, thus to execute a predictive computation. When the revolving speed at time $t_{OLD}$ is designated at $\omega_{OLD}$, the revolving speed at time $t_{NEW}$ at $\omega_{NEW}$, and the predictive revolving speed at time $t_{OUT}$ as $\omega_{OUT}$, these values are approximated by the following equations (6) to (8):

$$\omega_{OLD}=(\theta_{r\ OLD2}-\theta_{r\ OLD})/(t_{OLD2}-t_{OLD}) \quad (6),$$

$$\omega_{NEW}=(\theta_{r\ NEW}-\theta_{r\ OLD})/(t_{NEW}-t_{OLD}) \quad (7), \text{ and}$$

$$\omega_{OUT}=(\omega_{NEW}-\omega_{OLD})/(t_{OUT}-t_{NEW}) \quad (8).$$

Accordingly, the predictive rotational position $\theta_{r\ OUT}$ at time $t_{OUT}$ can be approximated by the following equation (9) when the speed from time $t_{NEW}$ to $t_{OUT}$ is designated as $\omega_{r\ OUT}$:

$$\theta_{r\ OUT}=\omega_{OUT} \times (t_{OUT}-t_{NEW})+\theta_{r\ NEW} \quad (9).$$

The microcomputer 16 executes the computation expressed by the equations (6) to (9) to output a predictive rotational position $\theta_{r\ OUT}$ at time $t_{OUT}$. Although the computation becomes complicated, a rotational position having a smaller error can be obtained.

In addition, it is needless to say that when this invention is applied to a linear synchro, the same advantages as above can be obtained in an apparatus for detecting linear position.

FOURTH EMBODIMENT

Figure 6:
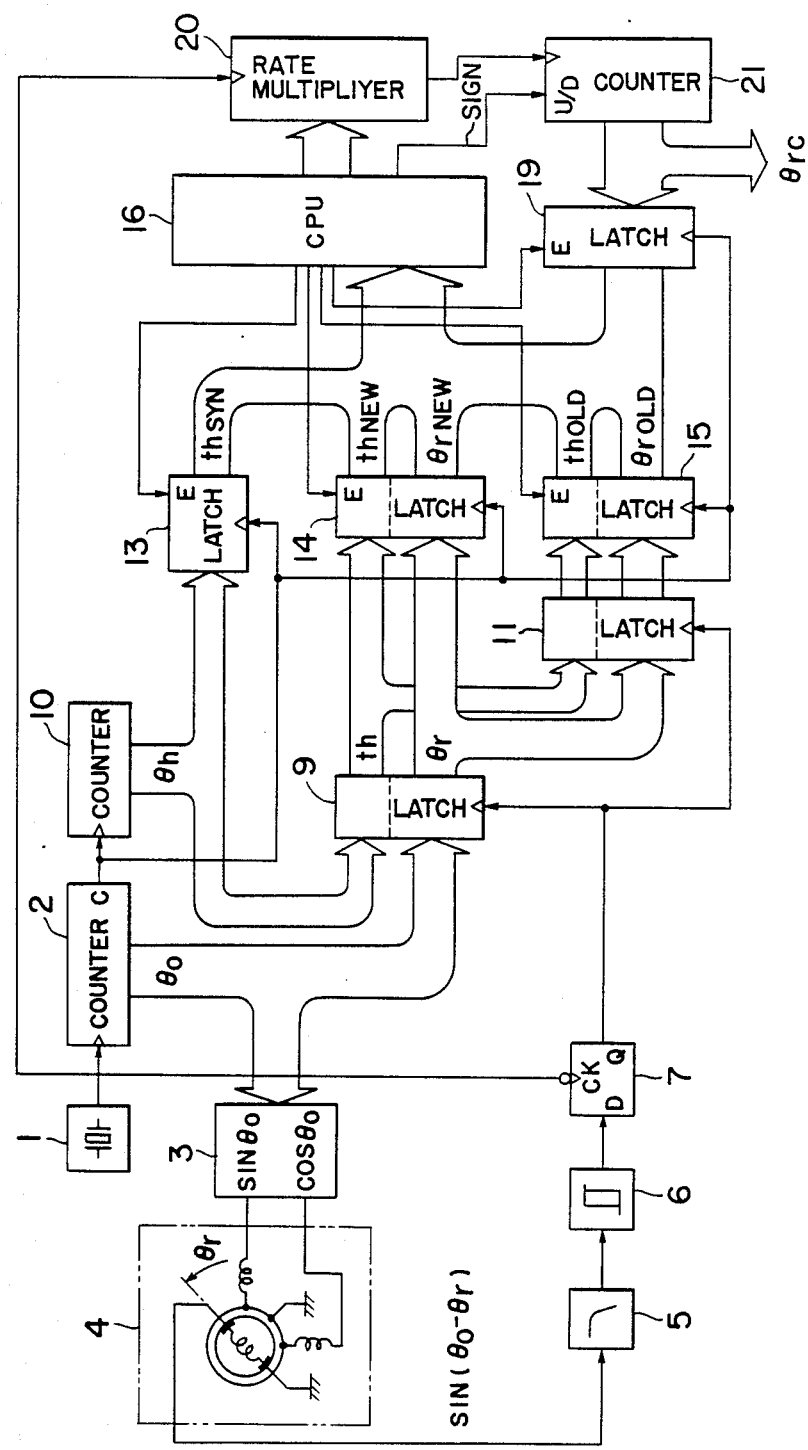
FIG. 6 is a block diagram showing a basic configuration of an apparatus for detecting revolution according to a fourth embodiment of this invention.

A fourth embodiment of this invention is shown in FIG. 6. The circuit according to this embodiment is characterized in that a latch circuit 19, a rate multiplier circuit 20, and an up/down counter circuit 21 are added to the circuit of the second embodiment shown in FIG. 4. Similarly to the circuit of the second embodiment, the predictive computation circuit is composed of latch circuits 11, 13, 14 and 15, and microcomputer 16, thus to compute a predictive rotational position every fixed period. In this embodiment, a value corresponding to a change in the predictive rotational position is further computed. The value corresponding to the change thus computed is applied as a rate input of the rate multiplier circuit 20. Thus, a pulse signal having a frequency corresponding to the rate input is output from the rate multiplier circuit 20. This pulse signal is counted by the up/down counter circuit 21. The count value of the up/down counter circuit 21 follows a predictive rotational position. As a result, a follow-up delay time and an advance time based on the predictive computation cancel each other. Thus, the rotational position can be detected as a digital value by the count value of the up/down counter circuit 21 substantially without delay.

Figure 7:
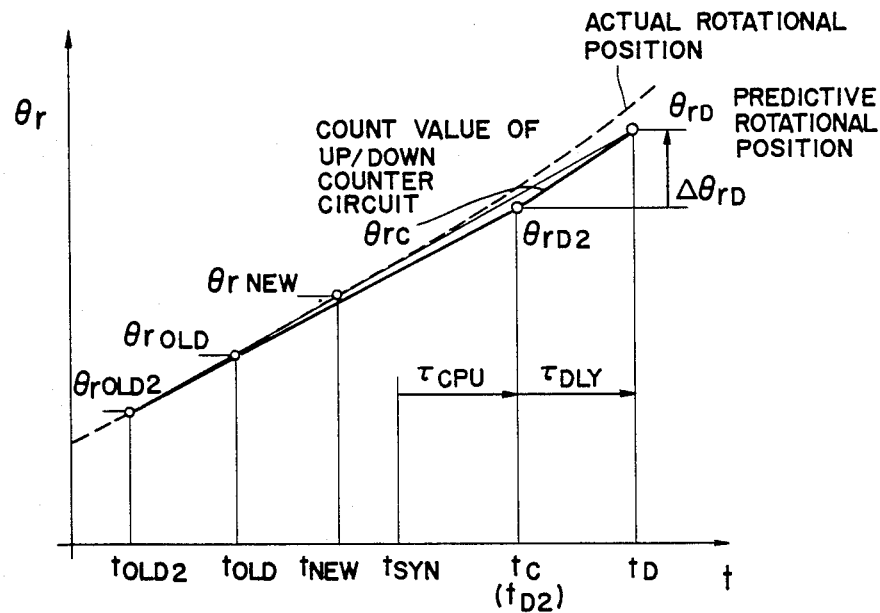
FIG. 7 is a graphical representation showing the principle of the predictive computation in the apparatus shown in FIG. 6.

The predictive computation in this circuit is performed as follows. Initially, the microcomputer 16 examines changes in data of the latch circuit 13. If there is any change, the microcomputer 16 reads thereinto these data to carry out a predictive computation. The principle of the computation for predicting a rotational computation is shown in FIG. 7 wherein the abscissa and the ordinate represent time t and rotational position $\theta_r$, respectively. In this figure, the latest rotational position data latched by the latch circuit 14 is designated as $\theta_r$ $_{NEW}$, the detection time data thereof as $t_{NEW}$, data indicative of the rotational position one time before as $\theta_r$ $_{OLD}$, the detection time data thereof as $t_{OLD}$ and time data combined with the lower order data $t_{l\ SYN}$ which is regarded as zero is designated at $t_{SYN}$ ($=t_{h\ SYN} \cdot 0$). For carrying out the predictive computation of a predictive rotational position $\theta_{rD}$ at time $t_D$, as shown, the predictive rotational position $\theta_{rD}$ is obtained by linear approximation from the rotation position $\theta_{r\ OLD}$ one time before and the detection time $t_{OLD}$ thereof, and the latest rotational position $\theta_r$ $_{NEW}$ and the detection time $t_{NEW}$ thereof. This predictive computation is expressed by the following equation (10):

$$\theta_{r\ D}=\{(\theta_{r\ NEW}-\theta_{r\ OLD}) \times (t_D-t_{NEW})/(t_{NEW}-t_{OLD})+\theta_{r\ NEW}\} \quad (10).$$

The time $t_{OUT}$ is defined as indicated by the equation (11) by taking into consideration the time $\tau_{CPU}$ required for the predictive computation by the microcomputer 16 and the follow-up delay time $\tau_{DLY}$:

$$t_{OUT}=t_{SYN}+\tau_{CPU}+\tau_{DLY}=t_D \quad (11)$$

Such predictive computations are repeatedly executed every time data of the latch circuit 13 varies, i.e., in synchronism with the excitation period. In the previous predictive computation, the predictive rotational position $\theta_r$ $_{D2}$ at time $t_C$ ($t_{D2}$) has been similarly determined from the rotational position $\theta_r$ $_{OLD2}$ further one time before and the detection time $t_{OLD2}$ thereof, and the rotational position $\theta_r$ $_{OLD}$ one time before and the detection time $t_{OLD}$ thereof. Accordingly, the time $\tau_{DLY}$ from the time $t_C$ to the time $t_D$ is equal to the excitation period. Thus, a change $\Delta\theta_{rD}$ in the predictive rotational position for this time is expressed by the following equation (12):

$$\Delta\theta_{rD}=\theta_{rD}-\theta_{rD2} \quad (12)$$

The microcomputer 16 executes the predictive computation indicated by the equations (10) and (11) and the predictive rotation positional change computation indicated by the equation (12) and outputs at time $t_C$ the absolute value $|\Delta\theta_{rD}|$ of the predictive rotation positional change $\Delta\theta_{rD}$ to the rate input of the rate multiplier 20, and outputs its sign SIGN to the up/down input U/D of the up/down counter circuit 21. From the rate multiplier circuit 20, pulses the number of which is in correspondence with the absolute value $|\Delta\theta_{rD}|$ given as the rate input are output substantially equidistantly for the time $\tau_{DLY}$. Such pulses are input to the clock of the up/down counter circuit 21. The count value $\theta_{rC}$ increases or decreases in dependence upon the sign SIGN given to the up/down input U/D. If the count value $\theta_{rC}$ is equal to the predictive rotational position $\theta_{rD2}$ one time before at time $t_C$, the count value $\theta_{rC}$ becomes equal to the predictive rotational position $\theta_{rD}$ at time $t_D$.

At times subsequent thereto, by the same operation as stated above, the predictive rotational position and the count value $\theta_{rC}$ of the up/down counter circuit 21 coincide with each other every period equal to the excitation period. The count value $\theta_{rC}$ substantially linearly changes during respective periods as shown in FIG. 7. The latch circuit 19 is provided for adjusting an initial value of the count value of the up/down counter circuit 21. In an initial condition, the microcomputer 16 reads thereinto the count value $\theta_{rC}$ of the up/down counter circuit 21 through the latch circuit 19, to operate the rate input of the rate multiplier circuit 20 so as to become equal to a value of the rotational position.

In accordance with the fourth embodiment of this invention having been described, the count value of the up/down counter circuit follows the rotational position substantially without delay. Thus, continuous rotational positions can be obtained as digital values.

While the predictive computation is performed by linear approximation from two rotational positions and their detection times thereof in the embodiment, such a computation may be performed by curvilinear approximation from three rotational positions or more and the detection times thereof. In addition, it is not required for the microcomputer 16 to allow the computational period to be in correspondence with the excitation period, in other words an arrangement such that the computational period is arbitrary may be employed.

It is needless to say that when this invention is applied to the linear synchronous electric machine, the same advantages as stated above can be obtained.

MERITS IN INDUSTRY

In accordance with this invention, the restriction of detection period and/or changes or fluctuations in the detection period depending upon revolving speed, etc., which have been drawbacks with a conventional apparatus for detecting revolution, are eliminated, whereby detection at an arbitrary time and detection every fixed period can be made. Accordingly, when an apparatus for detecting revolution according to this invention is used for digital control of an electric motor, synchronization between the sampling period for a digital control unit and the detection period can be readily established. Further, when applied to the multi-speed synchro, rotational positions of the plural synchros can be detected at the same time and synthesis of values detected is facilitated even when the revolving speed is high. In addition, since most of the circuits constituting this apparatus are of the digital circuit configuration, an implementation as an integrated circuit is possible, resulting in realization of manufacture of a small-sized and low cost apparatus.

What is claimed is:

1. An apparatus comprising:
    an excitation circuit for generating a polyphase a.c. excitation signal, and
    a synchro coupled to a rotary body in which a polyphase primary winding is excited by said a.c. excitation signal to generate on a secondary winding thereof an induced voltage signal the phase of which varies by an angle proportional to a rotational position of said rotary body, thus detecting a physical quantity relating to revolution on the basis of a phase difference produced between said a.c. excitation signal and said induced voltage signal,
    said apparatus further including:
    a phase difference detecting circuit for detecting a phase difference between said a.c. excitation signal and said induced voltage signal and a detection time thereof, and
    a predictive computation circuit for predicting a rotational position at an arbitrary time from at least two phase differences and their detection times thereof detected by said phase difference detecting circuit.

2. An apparatus as set forth in claim 1, wherein said excitation circuit comprises:
    a clock generator means,
    a first counter for counting a clock signal from said clock generator means, and
    a function generator means for generating the polyphase a.c. excitation signal on the basis of an output of said first counter; and
    wherein said phase difference detecting circuit comprises a second counter for counting higher order bits or figures overflowed from said first counter, thus detecting a time by using a count value of said second counter.

3. An apparatus as set forth in claim 1, wherein said predictive computation circuit comprises: a latch circuit for latching a phase difference and a detection time, and a microcomputer for performing a predictive computation on the basis of data in said latch circuit.

4. An apparatus for detecting revolution using a synchro, comprising:
    an excitation circuit for generating a polyphase a.c. excitation signal, and
    a synchro coupled to a rotary body, in which a polyphase primary winding is excited by said excitation signal to generate on a secondary winding thereof an induced voltage signal the phase of which varies by an angle proportional to a rotational angle of said rotary body, thus detecting a physical quantity relating to revolution on the basis of a phase difference produced between said a.c. excitation signal and said induced voltage,
    said apparatus further including:
    a phase difference detecting circuit for detecting a phase difference between said a.c. excitation signal and said induced voltage signal and a detection time thereof,
    a predictive computation circuit for predicting a rotational position of said rotary body at fixed periods of time from at least two phase differences and their detection times thereof detected by said phase difference detecting circuit,
    a rate multiplier circuit in which a value corresponding to a change in a rotational position predicted by said predictive computation circuit is set, and
    an up and down counter circuit for counting an output of said rate multiplier circuit, thus allowing a time for predicting a rotational position in said predictive computation circuit to be set to a time determined in consideration of a time required for said up and down counter circuit to follow so that an output of said up and down counter circuit is substantially in correspondence with a rotational position.

5. An apparatus as set forth in claim 4, wherein said excitation circuit comprises:
    a clock generator means,
    a first counter for counting a clock signal from said clock generator means, and a function generator means for generating the polyphase a.c. excitation signal on the basis of an output of said first counter; and wherein said phase difference detecting circuit comprises a second counter for counting higher order bits or figures overflowed from said first counter, thus detecting a time by using a count value of said second counter.

6. An apparatus as set forth in claim 4, wherein said predictive computation circuit comprises: a latch circuit for latching a phase difference and a detection time, and a microcomputer for performing a predictive computation on the basis of data in said latch circuit.

7. A method of detecting the rotational position of a rotating body, comprising the steps of:

generating a polyphase a.c. excitation signal and applying the a.c. excitation signal to a primary winding of a synchro, thus inducing a first signal in a secondary winding;

measuring the phase difference between the a.c. excitation signal and the first signal, the phase difference corresponding to the rotational position of the rotating body;

periodically storing the phase difference and a phase difference detection time; and predicting the rotational position of the rotating body using phase differences and phase difference detection times from at least two prior points in time.

8. A method of detecting the rotational position of a rotating body as set forth in claim 7, further comprising the steps of:

computing a first value corresponding to a change in the predicted rotational position;

generating a rate multiplier signal, using the first value, in the form of a pulse signal having a frequency associated with the change in the predicted rotational position;

counting the pulses of the pulse signal in a counter; and outputting the count value of the counter, the count value corresponding to the actual current rotational position of the rotating body, without any time delay.

* * * * *